United States Patent [19]
Suzuki et al.

[11] Patent Number: 5,089,884
[45] Date of Patent: Feb. 18, 1992

[54] METHOD OF EXPANDING COMPRESSED COLOR IMAGE DATA

[75] Inventors: Yoshiyuki Suzuki, Kawasaki; Masahiro Funada, Yokohama, both of Japan

[73] Assignee: Canon Kabushiki Kaisha, Tokyo, Japan

[21] Appl. No.: 362,014

[22] Filed: Jun. 6, 1989

[30] Foreign Application Priority Data

Jun. 10, 1988 [JP] Japan ................. 63-141826

[51] Int. Cl.$^5$ ............... G03F 3/8; H04N 7/00; H04N 7/12
[52] U.S. Cl. .................... 358/80; 358/133; 358/426; 358/433; 358/75; 382/56; 364/725
[58] Field of Search .............. 358/75, 80, 12, 13, 358/426, 428, 433, 133; 382/56; 364/725

[56] References Cited

U.S. PATENT DOCUMENTS

| | | | |
|---|---|---|---|
| 4,580,134 | 4/1986 | Campbell et al. | 358/133 |
| 4,758,885 | 7/1988 | Sasaki et al. | 358/75 |
| 4,887,151 | 12/1989 | Wataya | 358/75 |

Primary Examiner—James J. Groody
Assistant Examiner—Michael N. Lee
Attorney, Agent, or Firm—Fitzpatrick, Cella, Harper & Scinto

[57] ABSTRACT

In a method of expanding a compressed color image, in units of blocks each consisting of a plurality of pixels, to lightness information and chromaticity information representing a block, original lightness information is decoded on the basis of the compressed lightness information in units of blocks, and chromaticity information of each pixel in the block is decoded in accordance with a distribution and gradient of the decoded lightness information value.

12 Claims, 10 Drawing Sheets

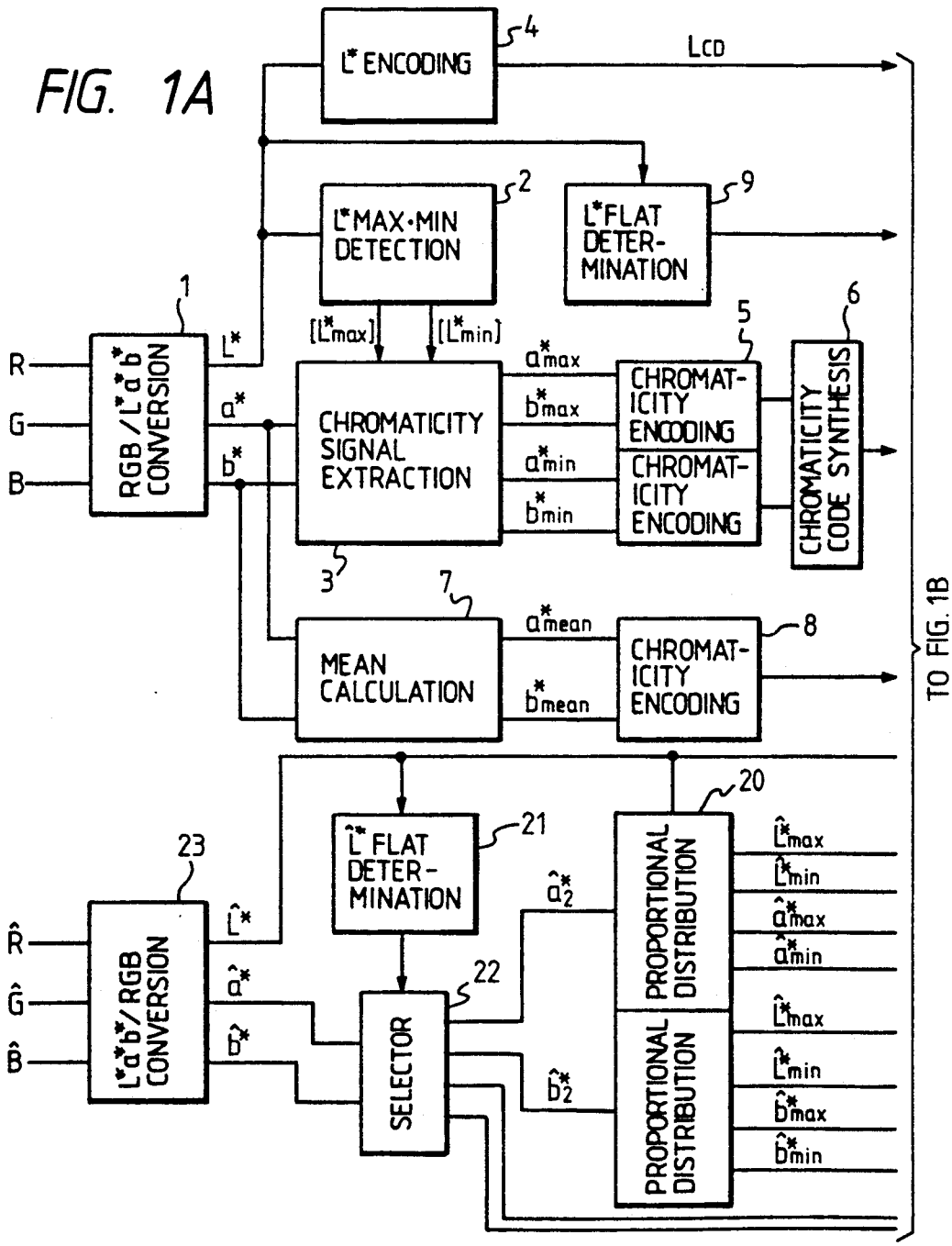

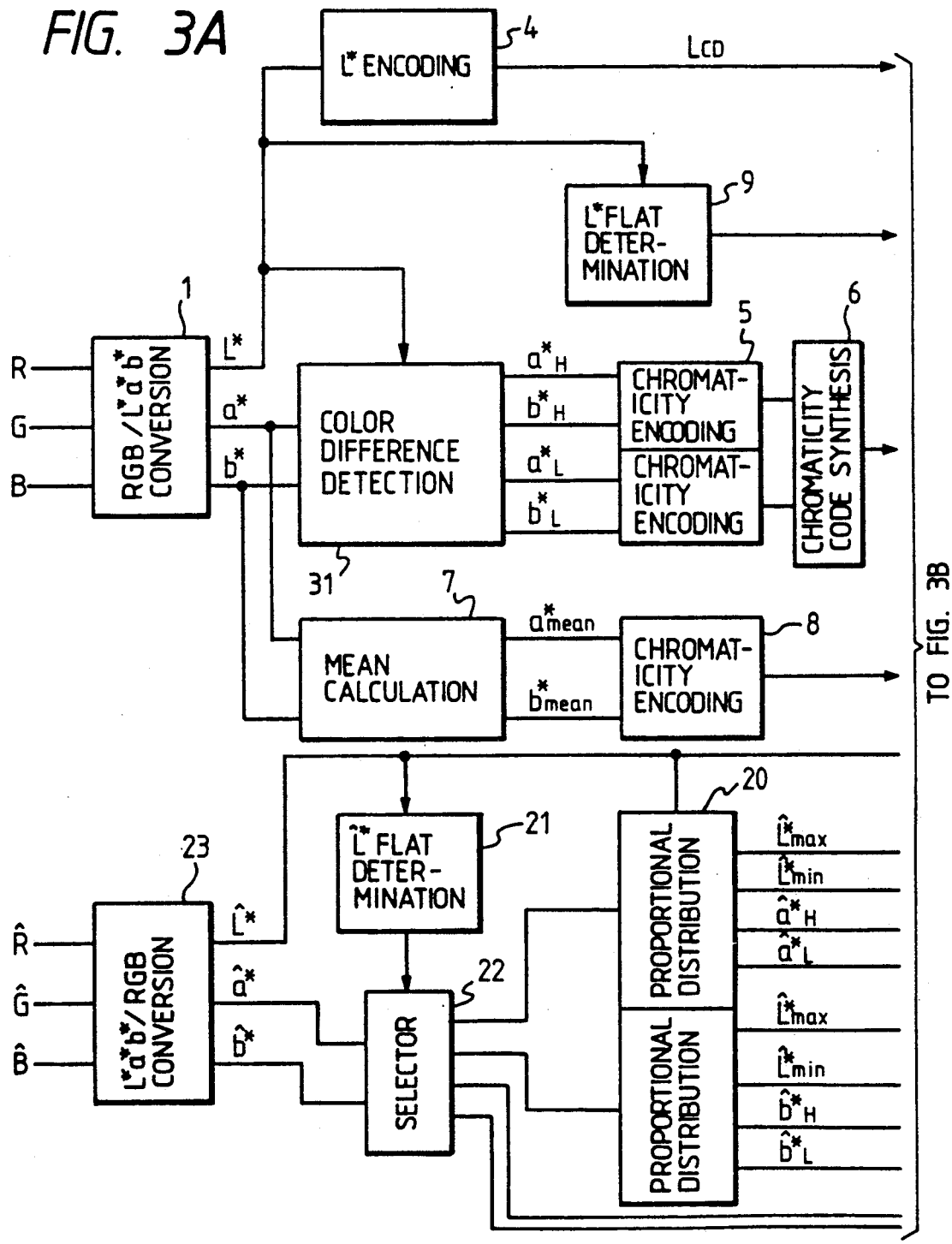

FIG. 4 a*

| (127) | 129 | 153 | 160 |
|---|---|---|---|
| 130 | 148 | 157 | 169 |
| 138 | 159 | 155 | (178) |
| 140 | 167 | 170 | 175 | b*

| (126) | 124 | 110 | 107 |
|---|---|---|---|
| 127 | 115 | 112 | 105 |
| 120 | 112 | 104 | (98) |
| 116 | 103 | 97 | 98 |

⇩

L*

| (198) | 188 | 152 | 137 |
|---|---|---|---|
| 196 | 155 | 142 | 131 |
| 163 | 143 | 140 | (128) |
| 155 | 133 | 130 | 125 |

$\Delta E_{max} = |a^*[1] - a^*[12]|$
$|b^*[1] - b^*[12]|$ $L^*[1] > L^*[12]$ $a^*_H = 127$
$b^*_H = 126$
$a^*_L = 178$
$b^*_L = 98$

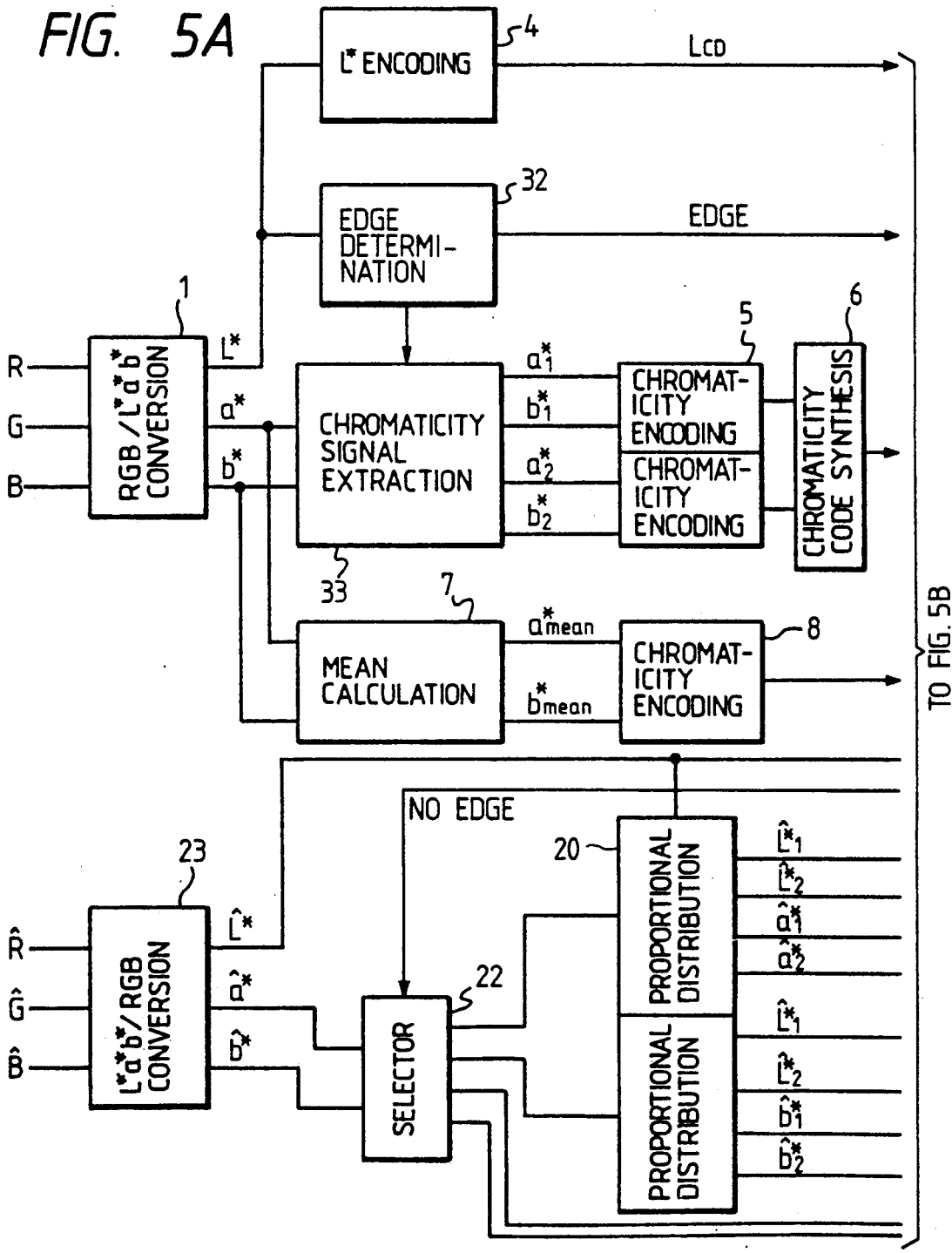

FIG. 8

| 1 | 2 | 3 | 4 |
|---|---|---|---|
| 5 | 6 | 7 | 8 |
| 9 | 10 | 11 | 12 |
| 13 | 14 | 15 | 16 |

| 198 | 188 | 152 | 137 |
|---|---|---|---|
| 196 | 155 | 142 | 131 |
| 163 | 143 | 140 | 128 |
| 155 | 133 | 130 | 125 |

$a^*$:

| 127 | 129 | 153 | 160 |
|---|---|---|---|
| 130 | 148 | 157 | 169 |
| 138 | 159 | 155 | 178 |
| 140 | 167 | 170 | 175 |

$b^*$:

| 126 | 110 | 107 | 105 |
|---|---|---|---|
| 124 | 115 | 112 | 98 |
| 120 | 112 | 104 | 98 |
| 116 | 103 | 97 | — |

$L^*_{mean} = 151$ $a^*_u = 138$, $a^*_\ell = 166$ $b^*_u = 119$, $b^*_\ell = 104$

COMPRESSION EXPANSION

$a^*_u = 138$, $a^*_\ell = 166$ $b^*_u = 119$, $b^*_\ell = 104$

(B)

$\hat{L}^*$:

| 198 | 188 | 152 | 137 |
|---|---|---|---|
| 196 | 155 | 142 | 131 |
| 163 | 143 | 140 | 128 |
| 155 | 133 | 130 | 125 |

$\hat{a}^*$:

| 138 | 138 | 166 | 166 |
|---|---|---|---|
| 138 | 138 | 166 | 166 |
| 138 | 138 | 166 | 166 |
| 138 | 138 | 166 | 166 |

$\hat{b}^*$:

| 119 | 119 | 104 | 104 |
|---|---|---|---|
| 119 | 119 | 104 | 104 |
| 119 | 119 | 104 | 104 |
| 119 | 119 | 104 | 104 |

METHOD OF EXPANDING COMPRESSED COLOR IMAGE DATA

BACKGROUND OF THE INVENTION

1. Field of the Invention

The present invention relates to a method of expanding color image data, in particular, color image data which is compressed after it is separated into lightness (or luminance) information and chromaticity information.

2. Description of the Prior Art

The present inventors proposed a method of realizing compression such that chromaticity information in a block is represented by two chromaticities in U.S. Pat. No. 4,887,151 and in U.S. patent application Ser. Nos. 185,024 (Apr. 21, 1988), and 261,276 (Oct. 24, 1988) as one method of compressing chromaticity information of color image data. This method is based on an assumption that if a compression unit is limited to a given small block, chromaticity information in the block can be sufficiently represented by two chromaticities in terms of the visual sense characteristics of the human eye.

A typical compression method will be described with reference to FIG. 7. In FIG. 7, color image data is divided in units of 4×4 pixels, and is converted into a CIE $L^*a^*b^*$ space as a lightness/chromaticity signal. All the image data to be processed are converted into an $L^*a^*b^*$ uniform color space and are normalized in the level range of from "0" to "255".

Part (A) of FIG. 7 shows original signals obtained by $L^*a^*b^*$-converting a color image represented by R, G, and B primary color data. A mean value $L^*$mean in a block of $L^*$ data is calculated. The $L^*$ data block is divided into two regions to have a bold line as a boundary using the mean value as a threshold value. Similarly, $a^*$ and $b^*$ data are also divided using similar boundaries. When each of the divided regions of the $a^*$ and $b^*$ data is represented by one chromaticity coordinate value, chromaticity data is compressed. More specifically, in part (A) of FIG. 7, a mean value of chromaticities of each region is employed as a representative value of the corresponding region. That is, if $L^*$mean=151 is the mean lightness of this block, a representative chromaticity of a region having a higher lightness (the upper left-hand region in part (A) of FIG. 7) is $(a^*U, b^*U)=(138, 119)$, and a representative chromaticity having a lower lightness is $(a^*L, b^*L)=(166, 104)$.

In this manner, chromaticity signals of 16 pixels are represented by two chromaticity signals, thus achieving compression of an information volume. In addition, a compression ratio can be increased.

Lightness information $L^*$ also undergoes compression/expansion. Note that in FIG. 7, for $L^*$, an information preservation type compression method such as a predicted encoding method with which expanded information can be completely decoded is employed.

In a conventional method, chromaticity data is expanded as follows. A pixel block of $L^*$ data which is decoded based on a similar principle to that in compression is divided into two regions using a mean lightness $L^*$mean=151 as a threshold value. Two decoded representative chromaticities $(\hat{a}^*U, \hat{b}^*U)=(138, 119)$ and $(\hat{a}^*L, \hat{b}^*L)=(166, 104)$ are assigned to the two regions, thus obtaining expanded blocks.

As described above, in FIG. 7, since no distortion occurs in compression/expansion of lightness, the $L^*$ data block before compression is completely reproduced. If an information non-preservation type compression method such as vector quantization is employed for the $L^*$ data block, the expanded $\hat{L}^*$ data is approximate to the $L^*$ data before compression.

However, in this method, the chromaticity information $\hat{a}^*$ and information $\hat{b}^*$ of the reproduced blocks can only take two states, respectively. This means that an unsatisfactorily reproduced image may be depending on according to the type of image to be processed. For example, when an original image is a color character image, its edge portion is not smooth and a good reproduced image cannot be obtained. This is caused by an immediate change in level at the edge portion since there are only two chromaticity levels. When the decoded lightness signal is distorted, a boundary may be changed to impair a reproduced image.

SUMMARY OF THE INVENTION

The present invention has been made to solve the above-mentioned problems, and has as its object to provide a method of expanding a compressed color image, which can minimize distortion of a decoded chromaticity signal and can improve quality of a reproduced image without decreasing compression efficiency.

It is another object of the present invention to provide a method of expanding a compressed color image, with which data obtained by compressing a color image with an edge, e.g., a color character can be satisfactorily reproduced.

It is still another object of the present invention to provide a method of expanding a compressed color image, with which data obtained by compressing not only a color image with an edge, e.g., a color character but also a flat (lightness) color image with no edge can be satisfactorily reproduced.

The above and other objects and features of the present invention will be apparent from the following description.

BRIEF DESCRIPTION OF THE DRAWINGS

FIG. 4 is a view for explaining in detail an operation of the second embodiment;

FIG. 7 is a view for explaining a prior art; and

FIG. 8 is a view for explaining a pixel position.

DETAILED DESCRIPTION OF THE PREFERRED EMBODIMENTS

A first preferred embodiment of the present invention will now be described.

Principle of Embodiment

This embodiment pays attention to the fact that lightness and chromaticity signals have remarkable correlation in a color image such as a color character. In a compression mode, two pieces of representative chromaticity information are extracted like in the prior art so as not to decrease a compression efficiency. In an expansion mode, a chromaticity signal of each pixel in a block is decoded in proportion to a lightness signal (i.e., utilizing the correlation with the lightness information) with reference to the two pieces of representative chromaticity information. The chromaticity is decoded in proportion to the lightness by utilizing the correlation between the chromaticity information and the lightness information. In this manner, the chromaticity signal can be reproduced as a signal for smoothly converting between two representative chromaticities as for the lightness signal.

Note that the large correlation between the lightness and chromaticity which are considered to have small correlation can be explained in such a manner that in a color character image, a block including a color edge is constituted by white as a background color and a color of a color character, i.e., achromatic and chromatic colors. In other words, a method of this embodiment is suitable for a color character image, and the method of this embodiment is adaptively employed in accordance with kinds of original image, thus obtaining effects of the present invention.

Three embodiments to which the above principle is applied will be described hereinafter.

First Embodiment

Figure 1B:
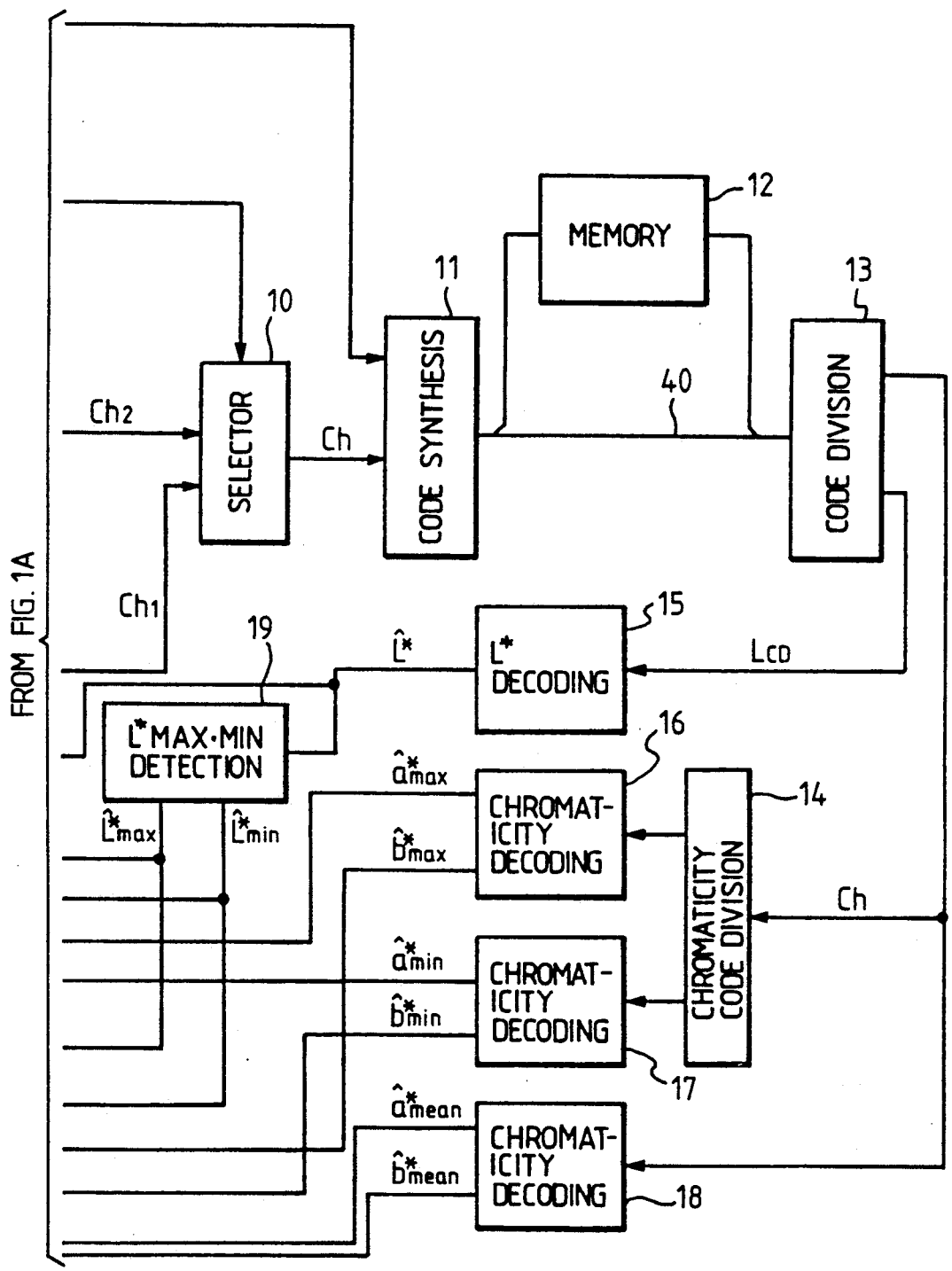
FIG. 1, consisting of FIGS. 1A and 1B, is a block diagram of a first embodiment.

FIG. 1 is a block diagram showing an arrangement of a first embodiment. In FIG. 1, an encoding compression section is constituted by components 1 to 11, and a decoding expansion section is constituted by components 13 to 23. Data may be directly transferred from the compression section to the expansion section or may be compressed by the expansion section after it is temporarily stored in a memory 12. In the following description, pixel positions in a block 16 are defined by pixel numbers "1" to "16", as shown in FIG. 8.

Compression

Color image data is input to the compression section as R, G, and B three primary color signals, and these signals are converted to L*, a*, and b* lightness and chromaticity signals by an RGB/L*a*b* conversion unit 1. In this case, the image data is divided into blocks by the conversion unit 1. In this embodiment, all the image data to be processed are converted to an L*a*b* uniform color space, and are normalized in a level range of "0" to "255".

First, an L* signal is encoded to a code $L_{CD}$ by an L* encoding unit 4. Simultaneously, maximum and minimum values of L* data in a block are detected by an L* max.min detection unit 2, and signals [L*max] and [L*min] indicating the positions of pixels exhibiting the maximum and minimum values are output to a chromaticity signal extraction unit 3. The chromaticity signal extraction unit 3 extracts chromaticity signals (a*max, b*max) and (a*min, b*min) corresponding to the pixel positions represented by [L*max] and [L*min]. These chromaticity signals are encoded to one code Ch2 by chromaticity encoding units 5 and a chromaticity code synthesis unit 6.

The encoding units 5 will be described in more detail. As has been described with reference to FIG. 7, when two representative chromaticities are extracted from chromaticity information of each of 16 pixels, information compression is attained to some extent. Therefore, when no more compression is necessary, a signal level can be processed as a code. When further compression is required, a method of using a mapping table may be used and can be easily realized by a memory element, e.g., a ROM, although detailed description thereof is omitted herein. In the embodiment shown in FIG. 1, two representative chromaticities are assumed to be separately compressed. Codes generated by the chromaticity encoding units 5 are synthesized by the chromaticity code synthesis unit 6, and the synthesized code is output as the code Ch2.

In the first embodiment, another encoding system (7 and 8 in FIG. 1) regardless of lightness information is prepared. The characteristic feature of the method of this embodiment is that two representative chromaticities of a block are extracted, and chromaticity information is decoded in proportion to lightness information with reference to these two chromaticities in an expansion mode. When proportional restoration of a chromaticity is adopted for all the image data, e.g., when a lightness signal of a block is flat, an error of a decoded chromaticity signal may be undesirably increased, thus causing considerable degration of a reproduced image. In the first embodiment, another chromaticity compression method in which a block is represented by one chromaticity is prepared. More specifically, a mean calculation unit 7 calculates mean values a*mean and b*mean of a* and b* data, and these mean values are compressed as a representative chromaticity (a*mean, b*mean) of this block by a chromaticity encoding unit 8. The representative chromaticity is expressed by Ch1. In the expansion mode, all the pixels in a block are decoded using one chromaticity regardless of L*.

Whether or not a block is flat is determined by an L* flat determination unit 9, and a determination signal from the unit 9 is used as a switching signal for a selector 10. When the L* flat determination unit 9 determines that a block is flat, the selector 10 selects the one representative chromaticity code Ch1; otherwise, selects the code Ch2. Various methods of determining whether or not a block is flat in terms of lightness may be employed. In this case, such a determination can be easily realized by transforming a lightness signal by Fourier or Hadamard transformation.

An output signal Ch from the selector 10 and the compression code $L_{CD}$ of the lightness signal are synthesized into one code by a code synthesis unit 11, and the code is transferred to a decoding section.

Note that the codes Ch1 and Ch2 have different code lengths since the code Ch2 includes two pieces of chromaticity information. More specifically, the code synthesized by the synthesis unit 11 is a variable length code in units of blocks. However, as long as it can be discriminated from L decoded by the decoding section whether or not a block is flat, there is no problem if the code has a variable length. When the codes Ch1 and Ch2 must be fixed length codes, lower bits of (a*max, b*max) and (a*min, b*min) may be cut off.

Expansion

The code transferred to the decoding section is divided into a light information code $L_{CD}$ and a chromaticity code Ch by a code division unit 13.

The lightness code $L_{CD}$ is decoded to a lightness signal L* by an L* decoding unit 15. Meanwhile, the chromaticity code Ch is divided into codes of two representative colors by a chromaticity code division unit 14. These codes are decoded to representative chromaticities (â*max, b̂*max) and (â*min, b̂*min) by chromaticity decoding units 16 and 17, respectively. The lightness signal L̂* is input to an L* max.min detection unit 19, so that a maximum value L̂*max and a minimum value L̂*min in a block are output.

Proportional distribution units 20 decode the chromaticity signals in proportion to the lightness signal L* with reference to these data. That is, $$a^*_2[n] = \frac{\hat{L}^*[n] - \hat{L}^*_{min}}{\hat{L}^*_{max} - \hat{L}^*_{min}}(\hat{a}^*_{max} - \hat{a}^*_{min}) + \hat{a}^*_{min}$$

$$b^*_2[n] = \frac{\hat{L}^*[n] - \hat{L}^*_{min}}{\hat{L}^*_{max} - \hat{L}^*_{min}}(\hat{b}^*_{max} - \hat{b}^*_{min}) + \hat{b}^*_{min}$$

where n corresponds to an nth pixel in a block. Processing expressed by the above equations is performed by the proportional distribution units 20, thus decoding the chromaticity signals â*2 and b̂*2.

When the block is flat in terms of the lightness, since the chromaticity code Ch must be a one-chromaticity code as in the compression mode, this code is simultaneously decoded by a chromaticity decoding unit 18 therefor. That is, a representative chromaticity (â*mean, b̂*mean) is decoded.

As in the compression mode, (a*mean, b*mean) or (a*2, b*2) is selected by a selector 22 on the basis of the determination result of an L̂* flat determination unit 21, i.e., whether or not a block is flat. The selected chromaticity is output as final chromaticity signals â* and b̂*. These chromaticity signals a* and b* and the lightness signal L* are converted to R, G, and B signals by an L*a*b*/RGB conversion unit 23.

Figure 2:
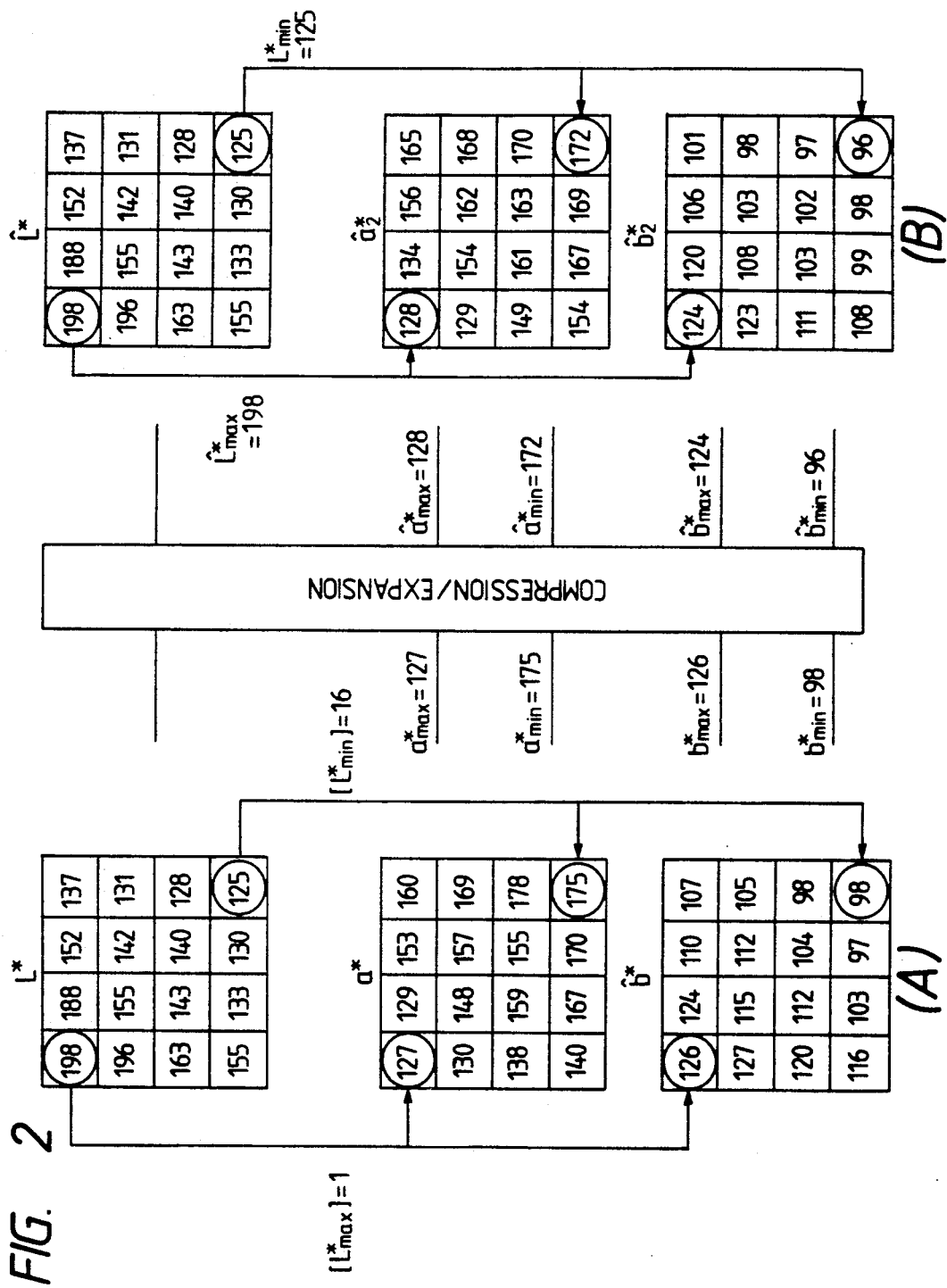
FIG. 2 is a view for explaining in detail an operation of the first embodiment.

FIG. 2 shows in detail an expansion/compression result according to the first embodiment. Part (A) of FIG. 2 shows original signals in an L*a*b* space. An L* signal is input to the L* max.min detection unit 2 to detect a maximum value L*max=198 and a minimum value L*min=125. Pixel numbers corresponding to the maximum and minimum values [L*max]=1 and [L*min]=16 are output. Chromaticities corresponding to the output pixel positions are extracted by the chromaticity signal extraction unit 3 as follows:

$$a^*_{max} = 127, \quad a^*_{min} = 175,$$
$$b^*_{max} = 126, \quad b^*_{min} = 98$$

Assume that these data are further compressed, and the compressed data are decoded by the decoding section in consideration of distortion caused by compression/expansion as follows:

$$\hat{a}^*_{max} = 128, \quad \hat{a}^*_{min} = 172,$$
$$\hat{b}^*_{max} = 124, \quad \hat{b}^*_{min} = 96$$

The chromaticity signals a*2 and b*2 shown in part (B) of FIG. 2 are decoded in proportion to the lightness signal L* by the proportional distribution units 20 with reference to these data and on the basis of the above-mentioned equations. Comparison between parts (B) of FIG. 2 and of FIG. 7 reveals that a change between two representative colors is smooth in this embodiment.

Second Embodiment

Figure 3B:
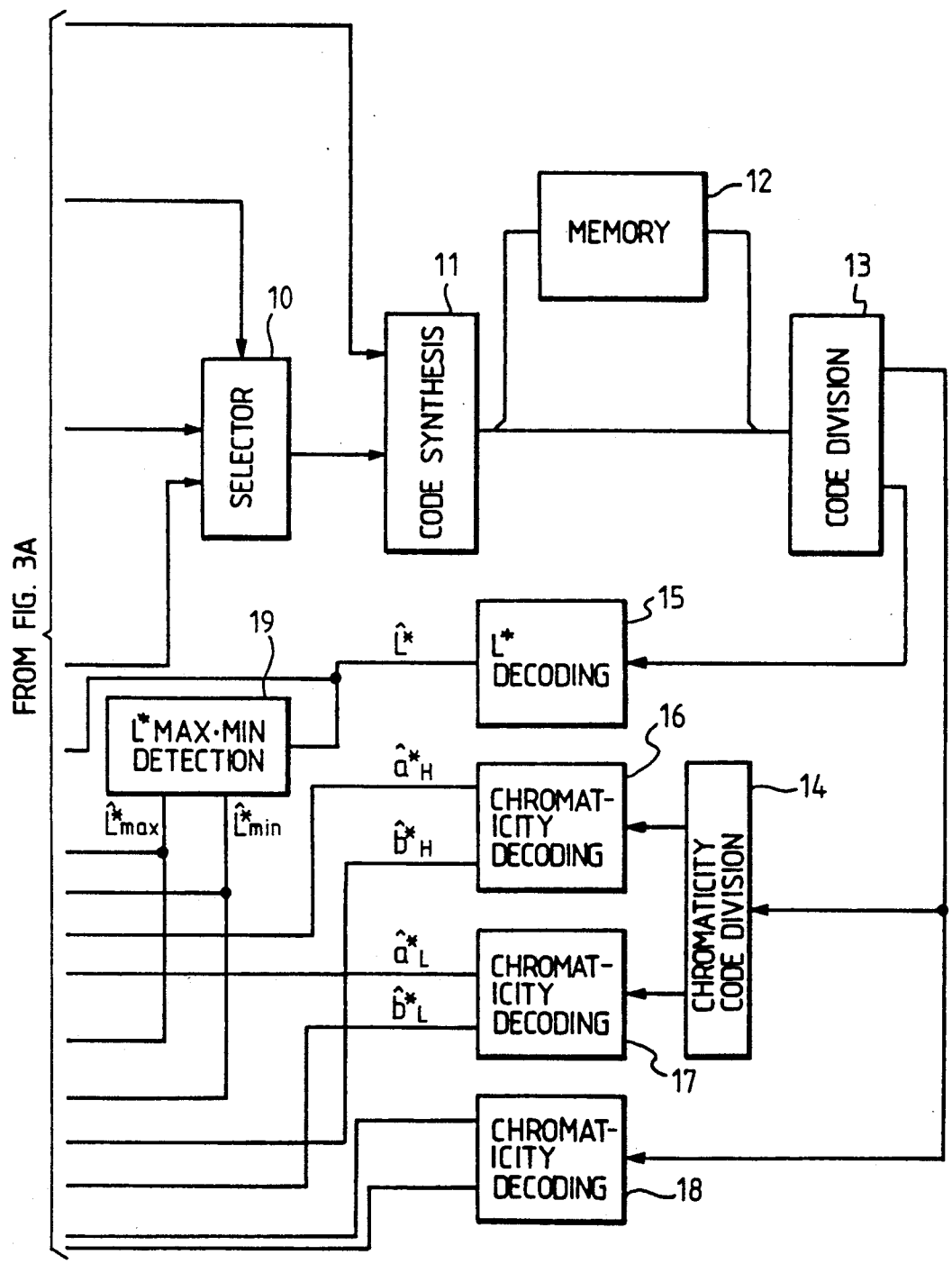
FIG. 3, consisting of FIGS. 3A and 3B, is a block diagram of a second embodiment.

FIG. 3 is a block diagram showing an arrangement of a second embodiment. The second embodiment is substantially the same as the first embodiment except for an extraction method for extracting two representative chromaticities in a block. That is, in the first embodiment, chromaticities a*max, b*max, a*min, and b*min at pixel positions yielding maximum and minimum lightnesses L*max and L*min are extracted as representative colors. However, in the second embodiment, two pixels having a maximum color difference therebetween in a block are detected by a color difference detection unit 31, and chromaticities of the two pixels are adopted as representative chromaticities. More specifically, in order to obtain two pixels having a maximum color difference in a block, for all the combinations of two pixels (m, n), each color difference ΔE is calculated by:

$$\Delta E_{mn} = |a^*[m] - a^*[n]| + |b^*[m] - b^*[n]| \quad (\text{for, } m < n)$$

Of the calculated differences, two pixels exhibiting a maximum value Emax are used as target pixels. Other arrangements are the same as those in the first embodiment. When it is determined that a block is not flat, encoding is performed using these representative chromaticities. Chromaticity information is decoded in proportion to L* as in the first embodiment.

Note that the color difference detection unit 31 extracts representative chromaticities regardless of maximum and minimum values of lightness. However, in the decoding section, the chromaticity signals are decoded so that the representative chromaticities correspond to pixels exhibiting maximum and minimum values (L̂*max, L̂*min) of the lightness signal.

FIG. 4 is presented for explaining the representative color extraction method of the second embodiment. Referring to FIG. 4, pixels having pixel numbers m=1 and n=12 exhibit a maximum color difference Emax in the equation for calculating the color difference. More specifically, two chromaticities, i.e., (a*, b*)=(127, 126) of the first pixel and (a*, b*)=(178, 98) of the 12th pixel are extracted as representative colors.

However, since the positional relationship between the two chromaticities is indefinite unless extra processing is made, the following processing is performed. That is, a chromaticity having a larger lightness is given by (a*H, b*H) and a chromaticity having a smaller lightness is given by (a*L, b*L). Therefore, in FIG. 4, since

L*[1]=1 9 8>L*[12]=1 2 8 the chromaticities are extracted as:

$(a^*_H, b^*_H) = (127, 126)$
$(a^*_L, b^*_L) = (178, 98)$

Note that in FIG. 4, pixels extracted in this manner are indicated by being circled.

Chromaticity information is decoded so that a pixel of L*max corresponds to (â*H, b̂*H) and a pixel of L*min corresponds to (â*L, b̂*L).

In this manner, it can be concluded that the method of selecting chromaticities having a maximum difference as two representative colors to be extracted is a method best matching with the principle that these two chromaticities are determined as those at two ends, and an interval between the two ends is interpolated in proportion to lightness, thereby decoding other chromaticity signals.

Third Embodiment

Figure 5B:
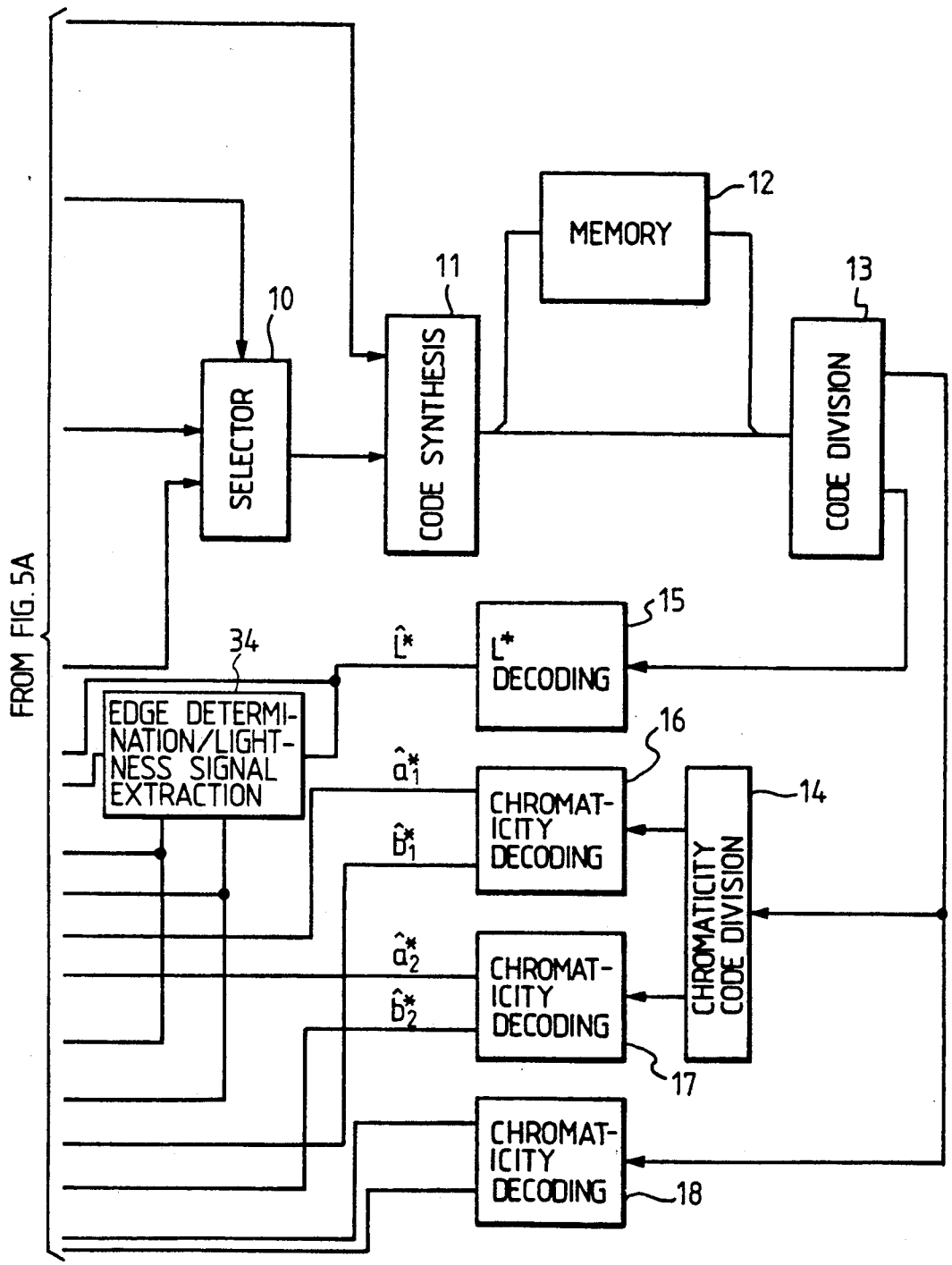
FIG. 5, consisting of FIGS. 5A and 5B, is a block diagram of a third embodiment.
Figure 6:
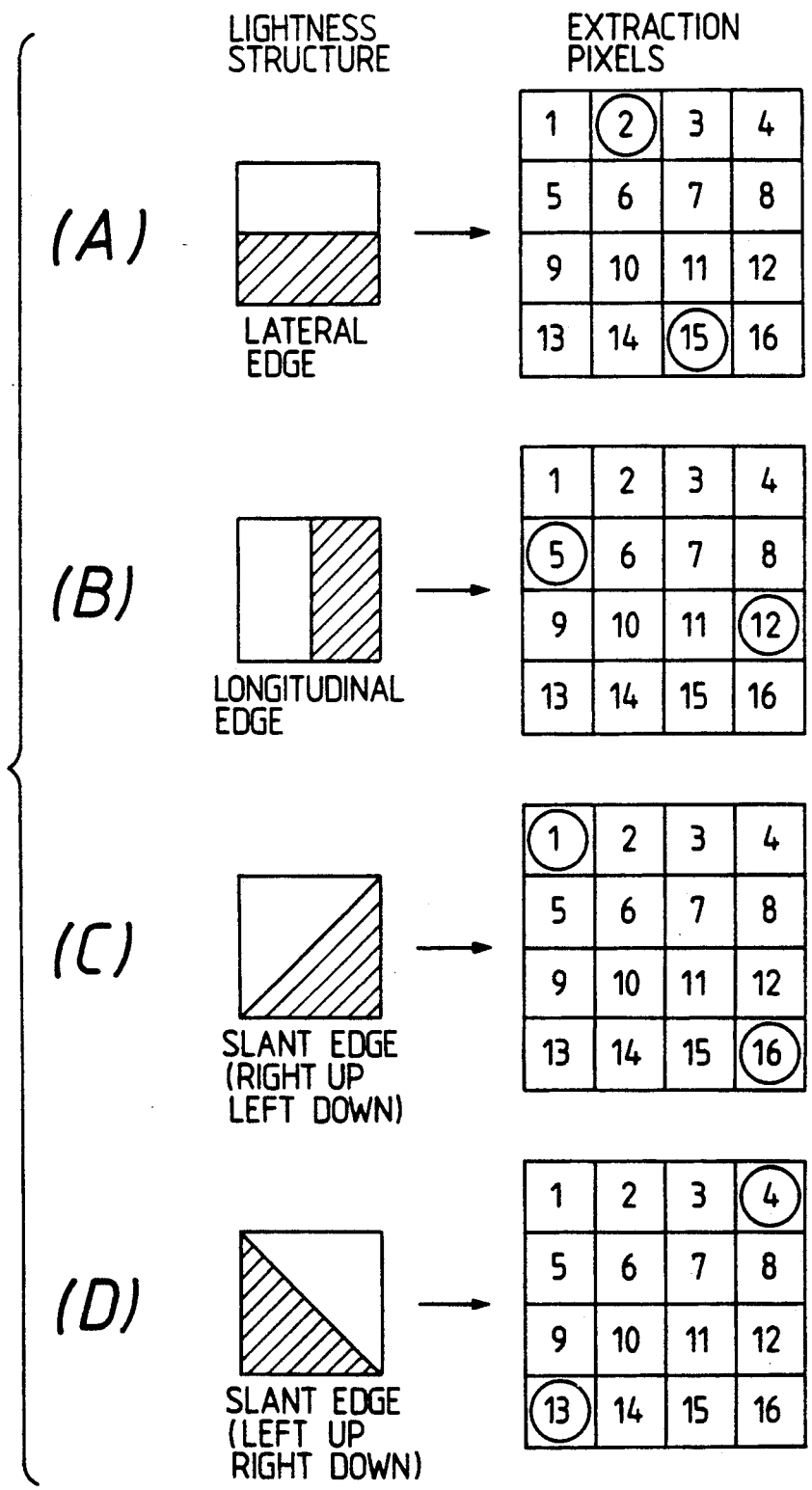
FIG. 6 is a view showing an edge pattern of the third embodiment.

FIG. 5 is a block diagram of a third embodiment, and FIG. 6 is a view for explaining in detail a representative color extraction section of the third embodiment.

The characteristic feature of the third embodiment is that a direction of an edge associated with a lightness of a block is detected, and chromaticities of predetermined pixels are determined as representative colors in correspondence with edge patterns, thereby extracting representative colors in a compression mode. More specifically, in this method, when an edge pattern of a lightness is determined, a pixel for extracting a representative color is uniquely determined.

In FIG. 5, an edge pattern of a lightness L* of a block is determined by an edge determination unit 32, and determination information is supplied to a chromaticity signal extraction unit 33. The chromaticity signal extraction unit 33 outputs chromaticity signals (a*1, b*1) and (a*2, b*2) of predetermined pixels corresponding to the edge patterns as representative colors.

Thereafter, the same processing as in the first and second embodiments is executed up to a decoding section.

FIG. 6 shows four edge patterns associated with a lightness, i.e., (A): lateral edge, (B): longitudinal edge, (C): slant (right up left down) edge, and (D): slant (left up right down) edge. The following representative chromaticities corresponding to these edge patterns are extracted: (A):

(A):
$(a^*_1, b^*_1) = (a^*[2], b^*[2])$;
$(a^*_2, b^*_2) = (a^*[15], b^*[15])$ (B):
$(a^*_1, b^*_1) = (a^*[5], b^*[5])$;
$(a^*_2, b^*_2) = (a^*[12], b^*[12])$ (C):
$(a^*_1, b^*_1) = (a^*[1], b^*[1])$;
$(a^*_2, b^*_2) = (a^*[16], b^*[12])$ (D):
$(a^*_1, b^*_1) = (a^*[4], b^*[4])$;
$(a^*_2, b^*_2) = (a^*[13], b^*[13])$

Note that numerical values in square brackets [ ] are pixel numbers.

In the expansion mode, the edge pattern is determined by an edge determination/lightness signal extraction unit 34 on the basis of the decoded lightness signal L*, and the pixel positions of the representative chromaticities are determined based on the determination result. Proportional distribution is performed using the decoded chromaticity signals (â*1, b̂*1) and (â*2, b̂*2) and the lightness signal of the representative pixel corresponding to the pattern, thus decoding the chromaticity signals. According to the patterns shown in FIG. 6, decoding equations are as follows:

(A): Lateral Ege
$$\hat{a}^*[n] = \frac{\hat{L}^*[n] - \hat{L}^*[15]}{\hat{L}^*[2] - \hat{L}^*[15]} \cdot (\hat{a}^*_1 - \hat{a}^*_2) + \hat{a}^*_2$$

$$\hat{b}^*[n] = \frac{\hat{L}^*[n] - \hat{L}^*[15]}{\hat{L}^*[2] - \hat{L}^*[15]} \cdot (\hat{b}^*_1 - \hat{b}^*_2) + \hat{b}^*_2$$

(B): Longitudinal Edge
$$\hat{a}^*[n] = \frac{\hat{L}^*[n] - \hat{L}^*[12]}{\hat{L}^*[5] - \hat{L}^*[12]} \cdot (\hat{a}^*_1 - \hat{a}^*_2) + \hat{a}^*_2$$

$$\hat{b}^*[n] = \frac{\hat{L}^*[n] - \hat{L}^*[12]}{\hat{L}^*[5] - \hat{L}^*[12]} \cdot (\hat{b}^*_1 - \hat{b}^*_2) + \hat{b}^*_2$$

(C): Slant (right up left down) Edge
$$\hat{a}^*[n] = \frac{\hat{L}^*[n] - \hat{L}^*[16]}{\hat{L}^*[1] - \hat{L}^*[16]} \cdot (\hat{a}^*_1 - \hat{a}^*_2) + \hat{a}^*_2$$

$$\hat{b}^*[n] = \frac{\hat{L}^*[n] - \hat{L}^*[16]}{\hat{L}^*[1] - \hat{L}^*[16]} \cdot (\hat{b}^*_1 - \hat{b}^*_2) + \hat{b}^*_2$$

(D): Slant (left up right down) Edge
$$\hat{a}^*[n] = \frac{\hat{L}^*[n] - \hat{L}^*[13]}{\hat{L}^*[4] - \hat{L}^*[13]} \cdot (\hat{a}^*_1 - \hat{a}^*_2) + \hat{a}^*_2$$

$$\hat{b}^*[n] = \frac{\hat{L}^*[n] - \hat{L}^*[13]}{\hat{L}^*[4] - \hat{L}^*[13]} \cdot (\hat{b}^*_1 - \hat{b}^*_2) + \hat{b}^*_2$$

As described above, as a method of compressing/expanding color image data in units of blocks, which is converted into lightness and chromaticity signals, two representative chromaticity signals are extracted and compressed. In an expansion mode, the chromaticity signals of the pixels in a block are decoded in proportion to the lightness signal with reference to the representative chromaticities, thus allowing high-quality image reproduction while maintaining a high compression efficiency.

In the first and second embodiments, the chromaticity compression/expansion methods are switched in accordance with whether or not lightness information is flat. However, in the third embodiment, flat/non-flat determination of the lightness is also performed by the edge determination unit. This is because detection of an edge direction of a lightness pattern can be realized by performing transformation such as a Fourier or Hadamard transformation of the lightness signal as in flat detection.

The three described embodiments have been examined under an assumption that a lightness signal is not distorted by compression/expansion. However, when the lightness signal is distorted, since determination is performed based on the lightness signal independently in compression and expansion sections to switch the compression/expansion methods, a noncoincidence between the determination results in the compression and expansion sections may be found. This also applies to determination of the pattern edge in the third embodiment. If such a noncoincidence occurs, this considerably degrades a reproduced image.

When an information non-preservation type method is adopted in compression of a lightness signal, a compression method in which processing is adaptively switched in accordance with a condition of an edge of a lightness and the edge state is coded, is preferably employed. For example, a compression method by adaptive cosine transformation or Hadamard transformation is known. With this method, a noncoincidence between the determination results in the compression and expansion sections can be prevented, and processing for determination in the expansion section can be omitted.

According to the method of expanding a compressed color image described above, in a method of expanding a compressed color image, in units of blocks each consisting of a plurality of pixels, to lightness information and chromaticity information representing a block, original lightness information is decoded from the compressed lightness information in units of blocks, and chromaticity information of each pixel in the block is decoded in accordance with a distribution and gradient of the decoded lightness information value.

Therefore, in the method of expanding a color image converted to lightness and chromaticity signals in units of blocks, chromaticity signals are decoded in proportion to the distribution of the lightness signal with reference to representative chromaticities, thus allowing high-quality image reproduction while keeping a high compression efficiency.

An image portion having a flat lightness is not subjected to expansion using the distribution of lightness information, thus allowing expansion suitable for image quality.

The present invention has been described with reference to arrangements of some specific embodiments. However, the present invention is not limited to these arrangements of the embodiments, and various changes and modifications may be made within the spirit and scope of the appended claims.

What is claimed is:

1. A method of expanding a compressed color image, in units of blocks each consisting of a plurality of pixels, to lightness information and chromaticity information representing a block, comprising:
   a first decoding step, in which original lightness information is decoded on the basis of compressed lightness information in units of blocks;
   calculating, for each block, a distribution and gradient of the decoded lightness information in the block; and
   a second decoding step, in which chromaticity information of each pixel in the block is decoded in accordance with the distribution and gradient of the decoded lightness information value.

2. A method according to claim 1, wherein said second decoding step further includes a detection step, in which maximum and minimum lightness values representing the clock are detected.

3. A method according to claim 1, wherein said second decoding step further includes a determination step, in which an edge is determined from the decoded lightness information.

4. A method according to claim 1, wherein the chromaticity information representing the block includes two pieces of chromaticity information corresponding to pixels yielding the maximum and minimum lightness values.

5. A method according to claim 1, wherein the chromaticity information representing the block includes chromaticity information of two pixels having a maximum color difference among the pixels in the block.

6. A method according to claim 1, wherein the chromaticity information representing the block includes chromaticity information of two predetermined pixels in correspondence with an edge pattern of the lightness information of the block.

7. A method of expanding a compressed color image, in units of blocks each consisting of a plurality of pixels, to lightness information and chromaticity information representing a block, comprising:
   a first decoding step, in which original lightness information is decoded on the basis of compressed lightness information in units of blocks;
   a determination step, in which a determination is made as to whether or not the color image in the block to be expanded is flat in terms of the lightness information;
   a second decoding step, in which chromaticity information of each pixel in the block is decoded in accordance with a distribution and gradient of the decoded lightness information value;
   a third decoding step, in which single chromaticity information is decoded as chromaticity information of pixels in the block; and
   a selection step, in which selection is made of one of the second and third decoding steps in accordance with a determination in said determination step as to whether or not the color image in the block to be expanded is flat in terms of the lightness information.

8. A method according to claim 7, wherein, when it is determined in said determination step that the color image is flat, said third decoding step is selected in said selection step.

9. A method according to claim 7, wherein chromaticity information representing a block which is not flat in terms of the lightness information includes two pieces of chromaticity information corresponding to pixels yielding maximum and minimum lightness values in the block.

10. A method according to claim 7, wherein chromaticity information representing a block which is not flat in terms of the lightness information includes chromaticity information of two pixels having a maximum color difference among the pixels in the block.

11. A method according to claim 7, wherein chromaticity information representing a block which is not flat in terms of the lightness information includes chromaticity information of two predetermined pixels in correspondence with an edge pattern of the lightness information of the block.

12. A method according to claim 7, wherein chromaticity information representing a block which is flat in terms of the lightness information is a mean value of chromaticity information of a plurality of pixels in the block.

* * * * *

UNITED STATES PATENT AND TRADEMARK OFFICE
CERTIFICATE OF CORRECTION

PATENT NO. : 5,089,884
DATED : February 18, 1992
INVENTOR(S) : YOSHIYUKI SUZUKI, ET AL.

It is certified that error appears in the above-identified patent and that said Letters Patent is hereby corrected as shown below:

COLUMN 1

Line 62, "L*mean = 151" should read --L̂*mean = 151--.

COLUMN 2

Line 8, "be" should read --be obtained,--.
Line 9, "according to" should be deleted.

COLUMN 5

Line 5, "a*2[n]=" should read --â*2[n]=--.
Line 8, "b*2[n]=" should read --b̂*2[n]=--.
Line 20, "(a*mean," should read --(â*mean,--.
Line 21, "(a*2, b*2)" should read --(â*2, b̂*2)--.
Line 24, "b*." should read --b̂*.--.
Line 25, "signals a* and b*" should read --
          --signals â* and b̂*--.
Line 50, "signals a*2 and b*2" should read --
          --signals â*2 and b̂*2--.
Line 52, "signal L*" should read --signal L̂*--.

COLUMN 6

Line 50, "L*max" should read --L̂*max-- and
         "L*min" should read --L̂*min--.

COLUMN 7

Line 21, "(A):" should be deleted.

UNITED STATES PATENT AND TRADEMARK OFFICE
CERTIFICATE OF CORRECTION

PATENT NO. : 5,089,884

DATED : February 18, 1992

INVENTOR(S) : YOSHIYUKI SUZUKI, ET AL.

It is certified that error appears in the above-identified patent and that said Letters Patent is hereby corrected as shown below:

<u>COLUMN 9</u>

Line 32, "clock" should read --block--.

Signed and Sealed this

Twenty-fifth Day of May, 1993

Attest:

MICHAEL K. KIRK

Attesting Officer     Acting Commissioner of Patents and Trademarks